(12) United States Patent
Yamada et al.

(10) Patent No.: US 11,453,747 B2
(45) Date of Patent: Sep. 27, 2022

(54) POLYESTER RESIN OR POLYESTER CARBONATE RESIN, AND OPTICAL MEMBER USING SAID RESIN

(71) Applicant: TEIJIN LIMITED, Osaka (JP)

(72) Inventors: Kyosuke Yamada, Osaka (JP);
Manabu Matsui, Osaka (JP);
Takatsune Yanagida, Osaka (JP);
Kazuyoshi Ogasawara, Osaka (JP);
Kazunori Nunome, Osaka (JP);
Keisuke Sato, Osaka (JP); Tatsuya Oyama, Osaka (JP)

(73) Assignee: TEIJIN LIMITED, Osaka (JP)

( * ) Notice: Subject to any disclaimer, the term of this patent is extended or adjusted under 35 U.S.C. 154(b) by 117 days.

(21) Appl. No.: 16/976,840

(22) PCT Filed: Mar. 11, 2019

(86) PCT No.: PCT/JP2019/009776
§ 371 (c)(1),
(2) Date: Aug. 31, 2020

(87) PCT Pub. No.: WO2019/176874
PCT Pub. Date: Sep. 19, 2019

(65) Prior Publication Data
US 2021/0002420 A1    Jan. 7, 2021

(30) Foreign Application Priority Data

Mar. 12, 2018   (JP) .............................. JP2018-044226

(51) Int. Cl.
C08G 63/672    (2006.01)
G02B 1/04    (2006.01)

(52) U.S. Cl.
CPC ........... C08G 63/672 (2013.01); G02B 1/041 (2013.01)

(58) Field of Classification Search
USPC ....... 528/190, 193, 194, 196, 198, 271, 272, 528/273, 274, 300; 359/109, 642
See application file for complete search history.

(56) References Cited

U.S. PATENT DOCUMENTS

| | | |
|---|---|---|
| 4,584,335 A | 4/1986 | Parker |
| 5,532,331 A | 7/1996 | Bales et al. |
| 5,910,562 A | 6/1999 | Miura et al. |
| 2005/0250930 A1 | 11/2005 | Ikeda et al. |
| 2008/0085955 A1 | 4/2008 | Yanagida et al. |
| 2010/0048855 A1 | 2/2010 | Kato et al. |
| 2010/0104777 A1 | 4/2010 | Motoyoshi et al. |
| 2012/0120356 A1 | 5/2012 | Washizu et al. |
| 2012/0123083 A1 | 5/2012 | Nunome et al. |
| 2012/0308796 A1 | 12/2012 | Tanaka et al. |
| 2013/0261283 A1 | 10/2013 | Motoyoshi et al. |
| 2014/0051300 A1 | 2/2014 | Yamakami |
| 2014/0268333 A1 | 9/2014 | Tanaka et al. |
| 2015/0285954 A1 | 10/2015 | Ishizuka et al. |
| 2016/0319069 A1 | 11/2016 | Shigematsu et al. |
| 2016/0326311 A1 | 11/2016 | Motoyoshi et al. |
| 2019/0241703 A1 | 8/2019 | Kato et al. |
| 2020/0181325 A1 | 6/2020 | Shiratake et al. |
| 2020/0190259 A1 | 6/2020 | Kato et al. |

FOREIGN PATENT DOCUMENTS

| | | |
|---|---|---|
| CN | 1711303 | 12/2005 |
| CN | 101680987 | 3/2010 |
| CN | 102257412 | 11/2011 |
| CN | 102352039 | 2/2012 |
| CN | 102630234 | 8/2012 |
| CN | 103201313 | 7/2013 |
| CN | 104263287 | 1/2015 |
| CN | 106029735 | 10/2016 |
| EP | 0 242 465 | 10/1987 |
| EP | 0 787 756 | 8/1997 |
| EP | 1 551 900 | 7/2005 |
| EP | 2 034 337 | 3/2009 |
| EP | 3 677 614 | 7/2020 |
| EP | 3 733 734 | 11/2020 |
| JP | 63-63718 | 3/1988 |
| JP | 6-145317 | 5/1994 |
| JP | 6-305044 | 11/1994 |
| JP | 07-198901 | 8/1995 |
| JP | 7-509269 | 10/1995 |

(Continued)

OTHER PUBLICATIONS

International Search Report dated Oct. 19, 2010 in International (PCT) Application No. PCT/JP2010/062481.

(Continued)

*Primary Examiner* — Terressa Boykin
(74) *Attorney, Agent, or Firm* — Wenderoth, Lind & Ponack, L.L.P.

(57) ABSTRACT

The purpose of the present invention is to provide a polyester resin or polyester carbonate resin, which has high refractive index, while achieving an excellent balance between heat resistance and low birefringence. A polyester resin or a polyester carbonate resin, which contains repeating units represented by the following formulae (1) and (2), and wherein the ratio of the repeating unit represented by formula (1) to the repeating unit represented by formula (2) is 15:85 to 85:15. (In formula (1), each of rings $Z^1$ and $Z^2$ represents a polycyclic aromatic hydrocarbon group having 9-20 carbon atoms; each of $R^1$, $R^2$, $R^7$ and $R^8$ independently represents a hydrocarbon group which may contain an aromatic group having 1-12 carbon atoms; each of $R^3$-$R^6$ and $R^9$-$R^{16}$ represents a hydrogen atom or an aliphatic or aromatic substituents; each of j, k, r and s independently represent an integer of 0 or more; and each of m, n, p and q independently represents 1 or 2) (In formula (2), each of $R^7$, $R^8$, $R^{17}$ and $R^{18}$ independently represent a hydrocarbon group which may contain an aromatic group having 1-12 carbon atoms; each of $R^9$-$R^{16}$ and $R^{19}$-$R^{26}$ represents a hydrogen atoms or an aliphatic or aromatic substituents; and each of r, s, t and u independently represents an integer of 0 or more.)

15 Claims, 1 Drawing Sheet

(56) References Cited

FOREIGN PATENT DOCUMENTS

| | | |
|---|---|---|
| JP | 8-54615 | 2/1996 |
| JP | 08-311189 | 11/1996 |
| JP | 9-268225 | 10/1997 |
| JP | 10-7782 | 1/1998 |
| JP | 10-87800 | 4/1998 |
| JP | 10-101786 | 4/1998 |
| JP | 10-120777 | 5/1998 |
| JP | 11-269259 | 10/1999 |
| JP | 2000-204150 | 7/2000 |
| JP | 2000-212271 | 8/2000 |
| JP | 2000-219736 | 8/2000 |
| JP | 2000-302857 | 10/2000 |
| JP | 2001-72872 | 3/2001 |
| JP | 2002-284871 | 10/2002 |
| JP | 2002-309015 | 10/2002 |
| JP | 2002-332345 | 11/2002 |
| JP | 2004-67990 | 3/2004 |
| JP | 2005-187661 | 7/2005 |
| JP | 2005-232252 | 9/2005 |
| JP | 2005-241962 | 9/2005 |
| JP | 2007-246629 | 9/2007 |
| JP | 2009-80424 | 4/2009 |
| JP | 2009-249307 | 10/2009 |
| JP | 2010-189562 | 9/2010 |
| JP | 2010-275412 | 12/2010 |
| JP | 2012-155193 | 8/2012 |
| JP | 2012-162590 | 8/2012 |
| JP | 2013-64119 | 4/2013 |
| JP | 2013-76982 | 4/2013 |
| JP | 2014-38772 | 2/2014 |
| JP | 2014-185325 | 10/2014 |
| JP | 2014-205829 | 10/2014 |
| JP | 2015-86265 | 5/2015 |
| JP | 2016-69643 | 5/2016 |
| JP | 2017-082038 | 5/2017 |
| JP | 2017-171885 | 9/2017 |
| JP | 2017-179323 | 10/2017 |
| JP | 2017-207759 | 11/2017 |
| JP | 2018-2893 | 1/2018 |
| JP | 2018-2894 | 1/2018 |
| JP | 2018-059074 | 4/2018 |
| JP | 2018-177887 | 11/2018 |
| KR | 10-1532334 | 6/2015 |
| WO | 94/02533 | 2/1994 |
| WO | 2007/142149 | 12/2007 |
| WO | 2009/058396 | 5/2009 |
| WO | 2011/010741 | 1/2011 |
| WO | 2014/073496 | 5/2014 |
| WO | 2015/170691 | 11/2015 |
| WO | 2017/010318 | 1/2017 |
| WO | 2017/146171 | 8/2017 |
| WO | 2018/008483 | 1/2018 |
| WO | 2018/016516 | 1/2018 |
| WO | 2019/044214 | 3/2019 |
| WO | 2019/044875 | 3/2019 |
| WO | 2019/131841 | 7/2019 |

OTHER PUBLICATIONS

International Preliminary Report on Patentability and Written Opinion dated Feb. 7, 2012 in International (PCT) Application No. PCT/JP2010/062481.
International Search Report dated May 25, 2010 in International (PCT) Application No. PCT/JP2010/053711.
International Search Report dated Mar. 31, 2015 in International (PCT) Application No. PCT/JP2015/056272.
Translation of International Preliminary Report on Patentability and Written Opinion of the International Searching Authority dated Sep. 15, 2016 in International (PCT) Application No. PCT/JP2015/056272.
International Search Report dated Aug. 21, 2018 in International (PCT) Patent Application No. PCT/JP2018/026613, with translation.
International Search Report dated May 7, 2019 in International (PCT) Application No. PCT/JP2019/011826.
Extended European Search Report dated Jan. 3, 2013 in European Application No. 10802361.5.
International Search Report dated May 19, 2020 in International (PCT) Application No. PCT/JP2020/007855.
International Search Report dated Jun. 11, 2019 in International (PCT) Application No. PCT/JP2019/009776.

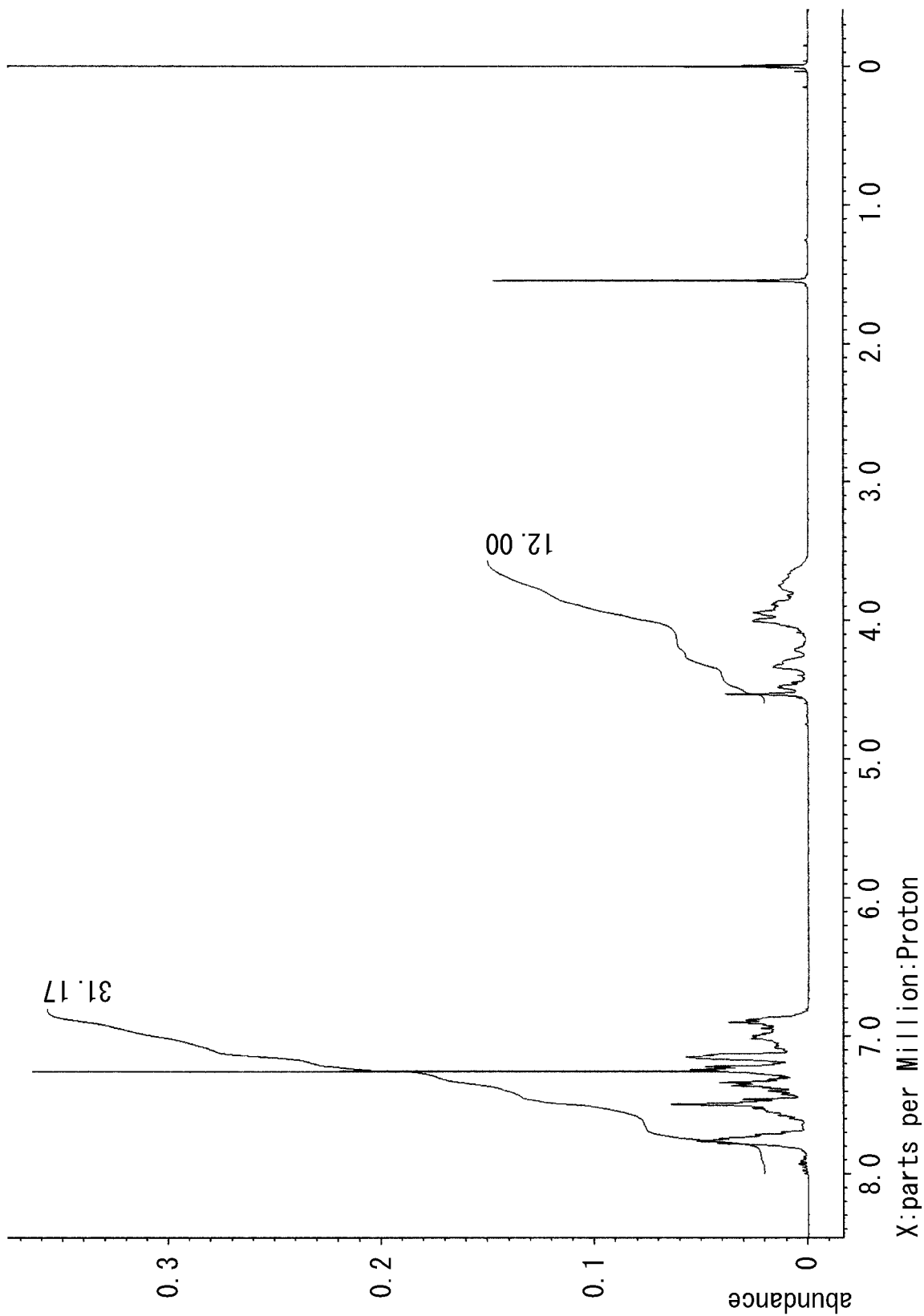

POLYESTER RESIN OR POLYESTER CARBONATE RESIN, AND OPTICAL MEMBER USING SAID RESIN

FIELD

The present invention relates to a polyester resin or polyester carbonate resin having high refractive index, low birefringence and superior balance between heat resistance and formability.

BACKGROUND

Imaging modules are used in applications such as video cameras, cell phones equipped with video capabilities, TV phones or camera-equipped intercoms. In recent years, optical systems used in these imaging modules are especially required to be compact. Reducing the size of optical systems results in the serious problem of chromatic aberration of the system. Therefore, chromatic aberration is known to be able to be corrected by combining an optical lens material having a high refractive index for the optical lens and high dispersion by reducing the Abbe number with an optical lens material having a low refractive index and low dispersion by increasing the Abbe number.

Although the glass conventionally used as materials of optical systems is able to realize various required optical properties as well as having superior environmental resistance, it has the problem of poor processability. In contrast, resins that are inexpensive and have superior processability in comparison with glass materials are used in optical components. In particular, resins having a fluorene skeleton or binaphthalene skeleton are used for reasons such as high refractive index. For example, a polycarbonate is described in PTL1 that uses 2,2'-bis(2-hydroxyethoxy)-1,1'-binaphthalene. PTL2 describes a thermoplastic resin that uses 9,9-bis[4-(2-hydroxyethoxy)-3-phenylphenyl]fluorene. PTL3 describes a resin that uses 9,9-bis[4-(2-hydroxyethoxy)-3-phenylphenyl]fluorene and 2,2'-bis(2-hydroxyethoxy)-1,1'-binaphthalene. The refractive indices of these resins range from 1.64 to 1.67, still having room for improvement. PTL4 describes a polyester resin that uses 2,2'-bis(ethoxycarbonylmethoxy)-1,1'-binaphthyl and 9,9-bis[4-(2-hydroxyethoxy)-3-phenylphenyl]fluorene, PTL5 and PTL6 describe a polycarbonate that uses 9,9-bis[6-(2-hydroxyethoxy)-2-naphthyl]fluorene and indicate a resin having a refractive index of 1.65-1.69. PTL7 describes a polycarbonate that uses 9,9-bis[4-(2-hydroxyethoxy)phenyl]-2,3-benzofluorene. The contents of this literature are incorporated in the present description by reference. However, although these resins have a high refractive index, they have room for improvement with respect to birefringence and inadequate balance between heat resistance and formability.

CITATION LIST

Patent Literature

[PTL1] International Publication No. WO 2014/073496
[PTL2] Japanese Unexamined Patent Publication No. 2015-86265
[PTL3] International Publication No. WO 2015/170691
[PTL4] Japanese Unexamined Patent Publication No. 2017-171885
[PTL5] Japanese Unexamined Patent Publication No. 2017-179323
[PTL6] International Publication No. WO 2018/016516
[PTL7] Japanese Unexamined Patent Publication No. 2018-177887

SUMMARY

Technical Problem

Therefore, an object of the present invention is to provide a polyester resin or polyester carbonate resin that has a high refractive index, low birefringence and superior balance between heat resistance and formability.

Solution to Problem

As a result of conducting extensive research to solve this object, the inventors of the present invention found that a polyester resin or polyester carbonate resin having a fluorene skeleton containing a specific aromatic group and binaphthalene skeleton has a high refractive index, low birefringence and superior balance between heat resistance and formability, thereby leading to completion of the present invention.

Namely, the present invention is as indicated below.

1. A polyester resin or polyester carbonate resin comprising repeating units represented by the following formulas (1) and (2), wherein the ratio of the repeating unit represented by the following formula (1) and repeating unit represented by the following formula (2) is 15:85 to 85:15:

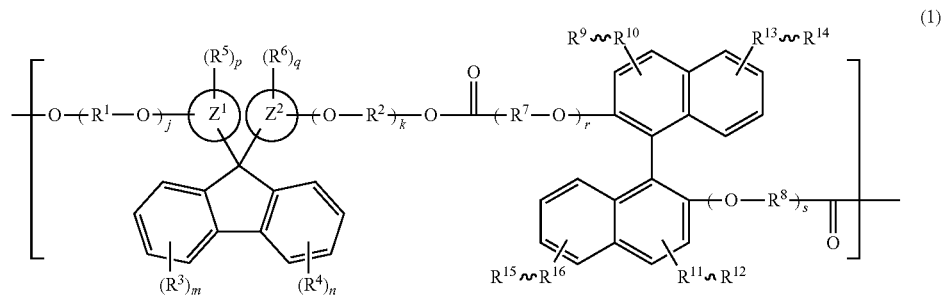

(wherein,
rings $Z^1$ and $Z^2$ respectively represent a polycyclic aromatic hydrocarbon group having 9 to 20 carbon atoms, $R^1$, $R^2$, $R^7$ and $R^8$ respectively and independently represent a hydrocarbon group that may contain an aromatic group having 1 to 12 carbon atoms, $R^3$-$R^6$ and $R^9$-$R^{16}$ represent hydrogen atoms or aliphatic or aromatic substituents, j, k, r and s respectively and independently represent an integer of 0 or more, and m, n, p and q respectively and independently represent 1 or 2); and

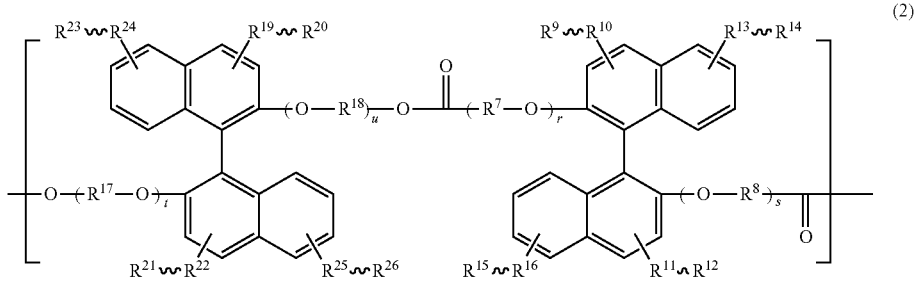

(wherein, $R^7$, $R^8$, $R^{17}$ and $R^{18}$ respectively and independently represent a hydrocarbon group that may contain an aromatic group having 1 to 12 carbon atoms, $R^9$-$R^{16}$ and $R^{19}$-$R^{26}$ represent hydrogen atoms or aliphatic or aromatic substituents, and r, s, t and u respectively and independently represent an integer of 0 or more).

2. The polyester resin or polyester carbonate resin described in 1 above, wherein $Z^1$ and $Z^2$ in formula (1) represent naphthalene-diyl groups.

3. The polyester resin or polyester carbonate resin described in 1 above, wherein formula (1) is composed of the unit represented by the following formula (3):

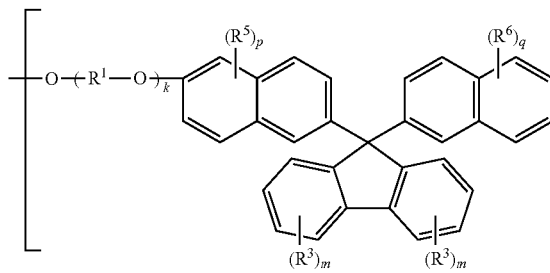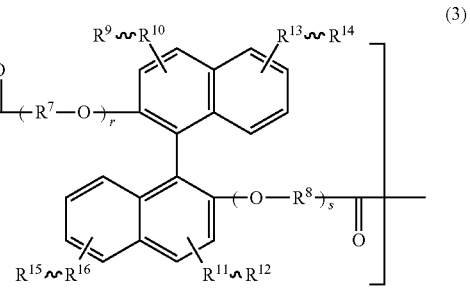

(wherein, $R^1$, $R^2$, $R^7$ and $R^8$ respectively and independently represent a hydrocarbon group that may contain an aromatic group having 1 to 12 carbon atoms, $R^3$-$R^6$ and $R^9$-$R^{16}$ represent hydrogen atoms or aliphatic or aromatic substituents, j, k, r and s respectively and independently represent an integer of 0 or more, and m, n, p and q respectively and independently represent 1 or 2).

4. The polyester resin or polyester carbonate resin described in 3 above, wherein $R^3$-$R^6$ and $R^9$-$R^{16}$ in formula (3) represent hydrogen atoms, and j, k, r, s, m, n, p and q represent 1.

5. The polyester resin or polyester carbonate resin described in 3 or 4 above, wherein $R^1$ and $R^2$ in formula (3) represent ethylene groups and $R^7$ and $R^8$ represent methylene groups.

6. The polyester resin or polyester carbonate resin described in any of 1 to 5 above, wherein the repeating unit represented by formula (1) constitutes 20 mol % or more of all repeating units.

7. The polyester resin or polyester carbonate resin described in any of 1 to 6 above, wherein $R^9$-$R^{16}$ and $R^{19}$-$R^{26}$ represent hydrogen atoms and r, s, t and u represent 1.

8. The polyester resin or polyester carbonate resin described in any of 1 to 7 above, wherein $R^7$ and $R^8$ in formula (2) represent methylene groups and $R^{17}$ and $R^{18}$ represent ethylene groups.

9. The polyester resin or polyester carbonate resin described in any of 1 to 8 above, wherein the repeating unit represented by formula (2) constitutes 20 mol % or more of all repeating units.

10. The polyester resin or polyester carbonate resin described in any of 1 to 9 above, wherein the ratio of the repeating unit represented by formula (1) and the repeating unit represented by formula (2) is 25:75 to 75:25.

11. The polyester resin or polyester carbonate resin described in any of 1 to 10 above, wherein the specific viscosity as measured for a solution obtained by dissolving in methylene chloride at 0.53% by weight is 0.12 to 0.40.

12. The polyester resin or polyester carbonate resin described in any of 1 to 11 above, wherein refractive index is 1.680 to 1.695.

13. The polyester resin or polyester carbonate resin described in any of 1 to 12 above, wherein the glass transition temperature is 140° C. to 155° C.

14. The polyester resin or polyester carbonate resin described in any of 1 to 13 above, wherein the absolute value of birefringence at 20° C. and wavelength of 589 nm in a film stretched two-times at a temperature 10° C. higher than the glass transition temperature is $0.001 \times 10^{-3}$ to $5 \times 10^{-3}$.

15. The polyester resin or polyester carbonate resin described in any of 1 to 14 above, wherein the amount of terminal carboxylic acid is 10 equivalents/ton or less.

16. The polyester resin or polyester carbonate resin described in any of 1 to 15 above, wherein the amount of fluorenone contained therein is 1 to 500 ppm or less.

17. The polyester carbonate resin described in any of 1 to 16 above, wherein the amount of phenol contained therein is 1 to 500 ppm or less.

18. An optical member composed of the polyester resin or polyester carbonate resin described in any of 1 to 17 above.

19. The optical member described in 18 above, which is an optical lens.

Advantageous Effects of Invention

The industrial effects demonstrated by the polyester resin or polyester carbonate resin of the present invention are extraordinary since it has a high refractive index, low birefringence and a superior balance between heat resistance and formability.

BRIEF DESCRIPTION OF DRAWINGS

FIG. 1 indicates the $^1$H-NMR spectrum of a polyester carbonate resin obtained in Example 6.

DESCRIPTION OF EMBODIMENTS

The following provides a more detailed explanation of the present invention.

<Polyester Resin or Polyester Carbonate Resin>

The polyester resin or polyester carbonate resin of the present invention contains the repeating units represented by the following formulas (1) and (2), wherein the ratio between the repeating unit represented by formula (1) and the repeating unit represented by formula (2) is 15:85 to 85:15:

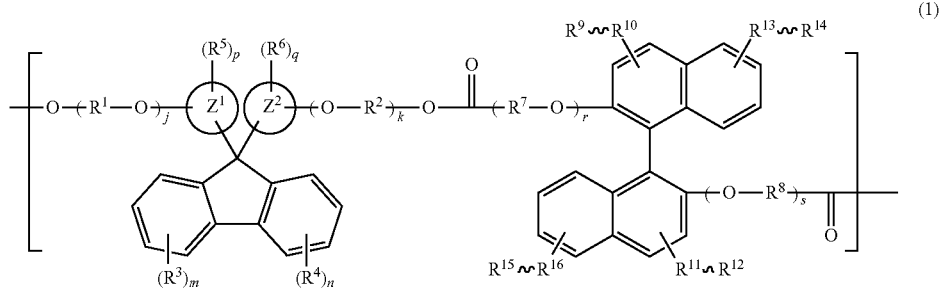

(wherein, rings $Z^1$ and $Z^2$ respectively represent a polycyclic aromatic hydrocarbon group having 9 to 20 carbon atoms, $R^1$, $R^2$, $R^7$ and $R^8$ respectively and independently represent a hydrocarbon group that may contain an aromatic group having 1 to 12 carbon atoms, $R^3$-$R^6$ and $R^9$-$R^{16}$ respectively and independently represent a hydrogen atom or aliphatic or aromatic substituent, j, k, r and s respectively and independently represent an integer of 0 or more, and m, n, p and q respectively and independently represent 1 or 2); and (wherein, $R^7$, $R^8$, $R^{17}$ and $R^{18}$ respectively and independently represent a hydrocarbon group that may contain an aromatic group having 1 to 12 carbon atoms, $R^9$-$R^{16}$ and $R^{19}$-$R^{26}$ represent hydrogen atoms or aliphatic or aromatic substituents, and r, s, t and u respectively and independently represent an integer of 0 or more).

In a preferable aspect of the polyester resin or polyester carbonate resin of the present invention, examples of the polycyclic aromatic hydrocarbon groups represented by rings $Z^1$ and $Z^2$ in formula (1) preferably include condensed polycyclic aromatic groups having at least 9 to 20 carbon atoms and more preferably include those having a benzene ring skeleton, and condensed bicyclic hydrocarbon groups or condensed tricyclic hydrocarbon group and the like are preferable. Examples of condensed bicyclic hydrocarbon groups preferably include aromatic hydrocarbon groups having 9 to 20 carbon atoms such as an indene ring or naphthalene ring, and more preferably include condensed bicyclic hydrocarbon groups having 10 to 16 carbon atoms. In addition, examples of condensed tricyclic hydrocarbon groups preferably include an anthracene ring and phenanthrene ring. These polycyclic aromatic hydrocarbon groups may have substituents.

In a preferable aspect of the polyester resin or polyester carbonate resin of the present invention, $Z^1$ and $Z^2$ of formula (1) represent naphthalene-diyl groups.

Examples of polycyclic aromatic hydrocarbon groups represented by rings $Z^1$ and $Z^2$ in formula (1) preferably include naphthalene-1,4-diyl groups and naphthalene-2,6-diyl groups, and more preferably include naphthalene-2,6-diyl groups.

In a preferable aspect of the polyester resin or polyester carbonate resin of the present invention, formula (1) is composed of units represented by the following formula (3):

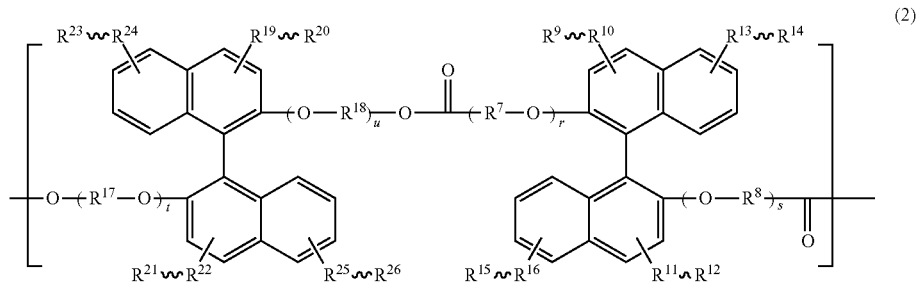

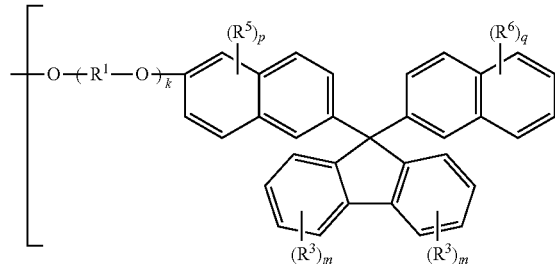 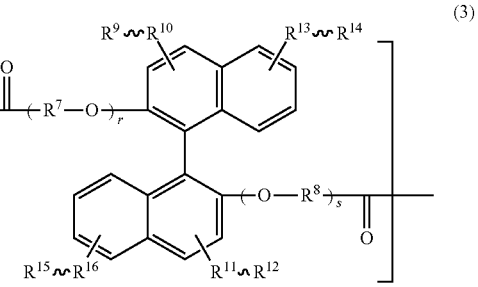

(3)

(wherein, $R^1$, $R^2$, $R^7$ and $R^8$ respectively and independently represent a hydrocarbon group that may contain an aromatic group having 1 to 12 carbon atoms, $R^3$-$R^6$ and $R^9$-$R^{16}$ represent hydrogen atoms or aliphatic or aromatic substituents, j, k, r and s respectively and independently represent an integer of 0 or more, and m, n, p and q respectively and independently represent 1 or 2).

Examples of $R^3$-$R^6$ and $R^9$-$R^{16}$ in formula (3) more preferably include hydrogen atoms, halogen atoms, alkyl groups, cycloalkyl groups, alkoxy groups and cycloalkyloxy groups, and even more preferably include hydrogen atoms.

In a preferable aspect of the polyester resin or polyester carbonate resin of the present invention, $R^1$, $R^2$, $R^7$, $R^8$, $R^{17}$ and $R^{18}$ respectively and independently represent a hydrocarbon group having 1 to 12 carbon atoms that may contain an aromatic group, and preferable examples thereof include an alkylene group such as a methylene group, ethylene group, propylene group or butylene group, and an arylene group such as a phenylene group or naphthalene-diyl group. Among these, a methylene group or ethylene group is more preferable. In particular, $R^1$, $R^2$, $R^{17}$ and $R^{18}$ preferably represent ethylene groups. In addition, $R^7$ and $R^8$ preferably represent methylene groups.

In a preferable aspect of the polyester resin or polyester carbonate resin of the present invention, $R^3$-$R^4$ in formulas (1) and (2) preferably represent hydrogen atoms, halogen atoms, alkyl groups, cycloalkyl groups, alkoxy groups and cycloalkyloxy groups, and among these, hydrogen atoms are more preferable.

In a preferable aspect of the polyester resin or polyester carbonate resin of the present invention. $R^5$-$R^6$, $R^9$-$R^{16}$ and $R^{19}$-$R^{26}$ in formulas (1) and (2) represent hydrogen atoms or substituents, hydrogen atoms are preferable, and specific examples of substituents preferably include halogen atoms, alkyl groups, cycloalkyl groups, aryl groups, aralkyl groups, alkoxy groups, cycloalkyloxy groups, aryloxy groups and aralkyloxy groups.

Preferable examples of halogen atoms include fluorine atoms, chlorine atoms and bromine atoms.

Specific examples of alkyl groups preferably include methyl groups, ethyl groups, propyl groups, isopropyl groups, butyl groups and t-butyl groups, more preferably include alkyl groups having 1 to 4 carbon atoms, and even more preferably include methyl groups or ethyl groups.

Specific examples of cycloalkyl groups preferably include cyclopentyl groups, cyclohexyl groups, cycloheptyl groups, cyclooctyl groups, cyclodecanyl groups, cyclododecanyl groups and 4-tert-butylcyclohexyl groups, and more preferably include cyclohexyl groups.

Specific examples of aryl groups preferably include phenyl groups, alkylphenyl groups (mono- and dimethylphenyl groups such as tolyl groups, 2-methylphenyl groups or xylyl groups) and naphthyl groups, more preferably include phenyl groups and naphthyl groups, and even more preferably include phenyl groups.

Specific examples of aralkyl groups preferably include benzyl groups and phenethyl groups, and more preferably include benzyl groups.

Specific examples of alkoxy groups preferably include methoxy groups, ethoxy groups, propoxy groups, isopropoxy groups and butoxy groups, more preferably include alkoxy groups having 1 to 4 carbon atoms, and even more preferably include methoxy groups and ethoxy groups.

Specific examples of cycloalkyloxy groups preferably include cyclopentyloxy groups, cyclohexyloxy groups, cycloheptyloxy groups and cyclooctyloxy groups, and more preferably include cyclohexyloxy groups.

Specific examples of aryloxy groups preferably include phenoxy groups, alkylphenoxy groups (mono- or dimethylphenoxy groups) and naphthyloxy groups, more preferably include phenoxy groups and naphthyloxy groups, and even more preferably include phenoxy groups.

Specific examples of aralkyloxy groups preferably include benzyloxy groups and phenethyloxy groups, and more preferably include benzyloxy groups.

It is known that the refractive index of a substance can be increased by increasing the electron density of the molecule and reducing molecular volume based on the relational expression between molecular structure and refractive index conventionally known as the Lorentz-Lorenz formula. The resins having a fluorene skeleton and binaphthalene skeleton indicated in PTL1-6 demonstrate an increase in refractive index by comprising a large number of aromatic groups within the molecule based on this theory. However, although these resins demonstrate high refractive indices, birefringence and the balance between heat resistance and formability are inadequate.

The specific ester structure represented by formula (1) of the present invention demonstrates a high refractive index, low birefringence and contributes to high heat resistance, while the specific ester structure represented by formula (2) demonstrates a high refractive index, although lower than formula (1), low birefringence, and contributes to formability as a result of lowering the glass transition temperature of the resin. Accordingly, the polyester resin or polyester carbonate resin comprising the repeating units represented by formulas (1) and (2) have a high refractive index, low birefringence and balance between heat resistance and formability.

The component ratio of the resin in the present invention indicates the molar ratio of the monomer structure introduced into the resin based on the number of moles of all monomer units. Furthermore, all monomer units referred to here do not include the carbonic acid unit used to produce the polyester carbonate resin.

A repeating unit in the present invention refers to the minimum unit that makes a connection with ester bonds and/or carbonate bonds. The repeating unit of ester bonds refers to a structural unit formed from diol components and dicarboxylic acid units, while the repeating unit of carbonate bonds refers to the structural unit formed from a diol derivative and carbonic acid component.

The molar ratio between the repeating unit represented by formula (1) and the repeating unit represented by formula (2) of the polyester resin or polyester carbonate resin of the present invention is 15:85 to 85:15.

The molar ratio between the repeating unit represented by formula (1) and the repeating unit represented by formula (2) is preferably 25:75 to 75:25 and more preferably 30:70 to 70:30. There is a superior balance between high refractive index and birefringence if within the aforementioned ranges.

In the resin of the present invention, the repeating units represented by formulas (1) and (2) may each be present at 10 mol % or more, 20 mol % or more, 30 mol % or more, 40 mol % or more or 50 mol % or more, and may be present at 90 mol % or less, 80 mol % or less, 70 mol % or less, 60 mol % or less, 50 mol % or less or 40 mol % or less. For example, these repeating units may each be present in the resin at 20 mol % to 80 mol % or 30 mol % to 70 mol %.

In the case the resin of the present invention is a polyester carbonate resin in particular, a repeating unit comprised of carbonate bonds is contained in addition to the repeating unit represented by formula (1) and the repeating unit represented by formula (2). The repeating unit comprised of carbonate bonds may be a repeating unit in which a portion of the ester bonds of the repeating units represented by formulas (1) to (3) have simply been changed to carbonate bonds. The repeating units comprised of carbonate bonds in the polyester carbonate resin of the present invention may be present at 5 mol % or more, 10 mol % or more, 15 mol % or more or 20 mol % or more, and may be present at 50 mol % or less, 40 mol % or less, 30 mol % or less, 20 mol % or lessor 10 mol % or less. For example, the repeating unit may be present at 5 mol % to 50 mol % or 10 mol % to 30 mol % in the resin.

In addition, repeating units other than the repeating unit of formula (1), the repeating unit of formula (2) and repeating unit in which a portion of the ester bonds thereof have been changed to carbonate bonds may not be present, or may be present at 0 mol % or more, 10 mol % or more, 20 mol % or more or 30% or more or may be present at 50 mol % or less, 40 mol % or less, 30 mol % or less, 20 mol % or less or 10 mol % or less.

In a preferable aspect of the polyester resin or polyester carbonate resin of the present invention, specific viscosity is preferably 0.12 to 0.40, more preferably 0.15 to 0.35, and even more preferably 0.18 to 0.30. Furthermore, specific viscosity is preferably within the aforementioned ranges since this results in superior balance between formability and mechanical strength. Furthermore, specific viscosity is the specific viscosity ($\eta_{sp}$) obtained by measuring at 20° C. using solution obtained by dissolving 0.53% by weight in methylene chloride (solution obtained by dissolving 0.7 g of resin in 100 ml of methylene chloride).

In a preferable aspect of the polyester resin or polyester carbonate resin of the present invention, refractive index at a wavelength of 589 nm measured at 25° C. (abbreviated as nD) is preferably 1.660-1.695, more preferably 1.670-1.695, even more preferably 1.680-1.695, still more preferably 1.685-1.695 and most preferably 1.688-1.695. In the case the refractive index is equal to or greater than the lower limit, spherical aberration of the lens can be reduced and focal distance of the lens can be shortened.

Although the polyester resin or polyester carbonate resin of the present invention has a high refractive index, it also preferably has a low Abbe number. The Abbe number (v) is preferably 15-21, more preferably 15-20 and even more preferably 15-18. The Abbe number is calculated using the following formula from the refractive indices at wavelengths of 486 nm, 589 nm and 656 nm measured at 25° C.:

$$v=(nD-1)/(nF-nC)$$

Furthermore, in the present invention:
nD: refractive index at wavelength of 589 nm
nC: refractive index at wavelength of 656 nm
nF: refractive index at wavelength of 486 nm.

In a preferable aspect of the polyester resin or polyester carbonate resin of the present invention, the glass transition temperature (Tg) is preferably 140° C. to 160° C., more preferably 140° C. to 155° C. and even more preferably 140° C. to 150° C. If the glass transition temperature is within the aforementioned ranges, the balance between heat resistance and formability is superior, thereby making this preferable.

In a preferable aspect of the polyester resin or polyester carbonate resin of the present invention, the absolute value of orientation birefringence ($|\Delta n|$) is preferably within the range of $0.001 \times 10^{-3}$ to $10 \times 10^{-3}$, more preferably $0.001 \times 10^{-3}$ to $5 \times 10^{-3}$, and even more preferably $0.001 \times 10^{-3}$ to $4 \times 10^{-3}$.

$|\Delta n|$ is determined according to the following formula by stretching a 100 μm film obtained from the polyester resin or polyester carbonate resin of the present invention two-times at a temperature 10° C. higher than Tg and measuring the retardation at a wavelength of 589 nm. If $|\Delta n|$ is within the aforementioned ranges, optical distortion of the lens is reduced thereby making this preferable.

$$|\Delta n|=|Re/d|$$

Δn: orientation birefringence
Re: retardation (nm)
d: thickness (nm)

In a preferable aspect of the polyester resin or polyester carbonate resin of the present invention, the total light transmittance for a thickness of 1 mm is preferably 80% or more, more preferably 85% or more and even more preferably 88% or more. If total light transmittance is within the aforementioned ranges, the resin is suitable as an optical member. Furthermore, total light transmittance is measured for a molded piece having a thickness of 1 mm using the NDH-300A manufactured by Nippon Denshoku Industries Co., Ltd.

In a preferable aspect of the polyester resin or polyester carbonate resin of the present invention, the degree of coloring, and particularly yellowish coloring, is preferably low. More specifically, the b* value of the CIE1976 (L*a*b*) color system is preferably 10.0 or less, 8.0 or less, 6.0 or less or 4.0 or less. The b* value is more preferably 3.0 or less and even more preferably 2.0 or less. This b* value is the value of the CIE1976 (L*a*b*) color system measured with a spectrophotometer for a solution obtained by dissolving 1.0 g in 5 ml of methylene chloride (solution obtained by dissolving in methylene chloride to 13% by weight).

In a preferable aspect of the polyester resin or polyester carbonate resin of the present invention, water absorption after immersing for 24 hours at 23° C. is preferably 0.25% by weight or less and more preferably 0.20% by weight or less. If water absorption is within the aforementioned ranges, changes in optical properties caused by absorption of water are small, thereby making this preferable.

In a preferable aspect of the polyester resin or polyester carbonate resin of the present invention, the amount of terminal carboxylic acid may be 12 equivalents/ton or less, 10 equivalents/ton or less, 6 equivalents/ton or less or 3 equivalents/ton or less, and preferably 1 equivalent/ton or less. If the amount of terminal carboxylic acid is greater than 12 equivalents/ton, the carboxylic acid acts as a catalyst of hydrolysis of ester bonds, which may exacerbate wet heat resistance. If the amount of terminal carboxylic acid is 12 equivalents/ton or less, wet heat resistance is superior, thereby making this preferable. The amount of terminal carboxylic acid can be measured by titration after having dissolved 0.1 g of resin in 20 ml of benzyl alcohol at 200° C. in a nitrogen atmosphere.

In a preferable aspect of the polyester resin or polyester carbonate resin of the present invention, wet heat resistance can be evaluated by treating in an environment at a temperature of 85° C. and relative humidity of 85% for a prescribed amount of time followed by comparing specific viscosity of the resin before and after treatment. More specifically, wet heat resistance can be calculated with the formula below.

Wet heat resistance (%)=[specific viscosity of resin after treatment]/[specific viscosity of resin before treatment]×100

Wet heat resistance after treating for 500 hours is preferably 76% or more, more preferably 90% or more, and even more preferably 98% or more.

The following provides an explanation of specific raw materials used in the polyester resin or polyester carbonate resin of the present invention.

<Raw Material Monomers>

(Diol Component of Formula (1))

The diol component serving as a raw material of formula (1) of the present invention is a mainly a diol component represented by the following formula (a) and may be used alone or two or more types thereof may be used in combination.

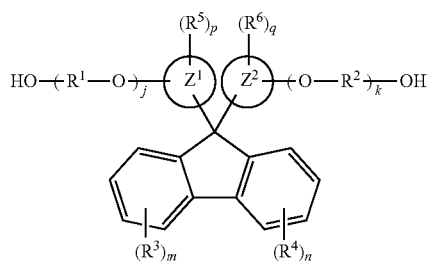

(a)

In formula (a), $Z^1$, $Z^2$, $R^1$-$R^6$, j, k, m, n, p and q are the same as defined in formula (1).

Although the following indicates typical specific examples of the diol component represented by formula (a), the raw material used in formula (1) of the present invention is not limited thereto.

More specifically, preferable examples include 9,9-bis(4-(2-hydroxyethoxy)-1-naphthyl) fluorene, 9,9-bis(4-(2-hydroxypropoxy)-1-naphthyl) fluorene, 9,9-bis(6-(2-hydroxyethoxy)-2-naphthyl) fluorene, 9,9-bis(6-(2-hydroxypropoxy)-2-naphthyl) fluorene, 9,9-bis(4-hydroxy-1-naphthyl) fluorene and 9,9-bis(6-hydroxy-2-naphthyl) fluorene. Among these, 9,9-bis(4-(2-hydroxyethoxy)-1-naphthyl) fluorene, 9,9-bis(6-(2-hydroxyethoxy)-2-naphthyl) fluorene, 9,9-bis(4-hydroxy-1-naphthyl) fluorene and 9,9-bis(6-hydroxy-2-naphthyl) fluorene are more preferable, and 9,9-bis(4-(2-hydroxyethoxy)-1-naphthyl) fluorene and 9,9-bis(6-(2-hydroxyethoxy)-2-naphthyl) fluorene are even more preferable.

These may be used alone or two or more types may be used in combination.

(Diol Component of Formula (2))

The diol component serving as a raw material of formula (2) of the present invention is mainly a diol component represented by the following formula (b), and may be used alone or two or more types may be used in combination.

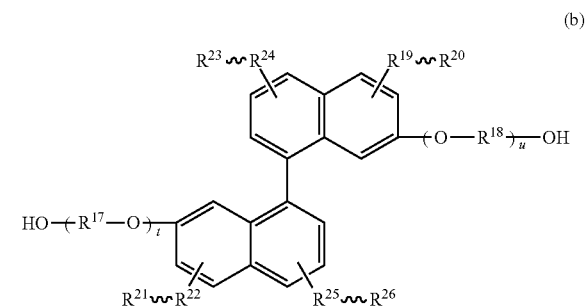

(b)

In formula (b), $R^{17}$-$R^{26}$, t and u are the same as defined in formula (2).

Although the following indicates typical specific examples of the diol component represented by formula (b), the raw material used in formula (2) of the present invention is not limited thereto.

More specifically, preferable examples include 2,2'-bis(2-hydroxyethoxy)-1,1'-binaphthyl, 2,2'-bis(2-hydroxyethoxy)-3,3'-diphenyl-1,1'-binaphthyl, 2,2'-bis(2-hydroxyethoxy)-6,6'-diphenyl-1,1'-binaphthyl, 2,2'-bis(2-hydroxyethoxy)-7,7'-diphenyl-1,1'-binaphthyl, 2,2'-bis(2-hydroxyethoxy)-3,3'-dimethyl-1,1'-binaphthyl, 2,2'-bis(2-hydroxyethoxy)-6,6'-dimethyl-1,1'-binaphthyl, 2,2'-bis(2-hydroxyethoxy)-7,7'-dimethyl-1,1'-binaphthyl, 1,1'-bi-2-naphthol, 2,2'-dihydroxy-3,3'-diphenyl-1,1'-binaphthyl, 2,2'-dihydroxy-6,6'-diphenyl-1,1'-binaphthyl and 2,2'-dihydroxy-7,7'-diphenyl-1,1'-binaphthyl. Among these, 2,2'-bis(2-hydroxyethoxy)-1,1'-binaphthyl and 1,1'-bi-2-naphthol are more preferable, and 2,2'-bis(2-hydroxyethoxy)-1,1'-binaphthyl is even more preferable.

These may be used alone or two or more types may be used in combination.

(Diol Components Other than Formula (1) and Formula (2))

The polyester resin or polyester carbonate resin of the present invention may also have other diol components copolymerized to a degree that does not impair the characteristics of the present invention. Other diol components are preferable present at less than 30 mol % in all repeating units.

Diol components known in the art can be used as other diol components able to be used in the polyester resin or polyester carbonate resin of the present invention, and in addition to the diols described in paragraph [0040] of PTL7, examples thereof include 9,9-bis(4-hydroxyphenyl) fluorene, 9,9-bis(4-hydroxy-3-methylphenyl) fluorene, 9,9-bis(4-hydroxy-3-cyclohexylphenyl) fluorene, 9,9-bis(4-hydroxy-3-phenylphenyl) fluorene, 9,9-bis(4-(2-hydroxyethoxy)phenyl) fluorene, 9,9-bis(4-(2-hydroxyethoxy)-3-methylphenyl) fluorene, 9,9-bis(4-(2-hydroxyethoxy)-3-cyclohexylphenyl) fluorene, 9,9-bis(4-(2-hydroxyethoxy)-3-phenylphenyl) fluorene and 10,10-bis(4-hydroxyphenyl) anthrone, and these may be used alone or two or more types may be used in combination.

(Dicarboxylic Acid Components of Formula (1) and Formula (2))

Dicarboxylic acids represented by the following formula (c) or ester-forming derivatives thereof are preferably used as dicarboxylic acid components used in the units represented by formula (1) and formula (2) of the polyester resin or polyester carbonate resin of the present invention.

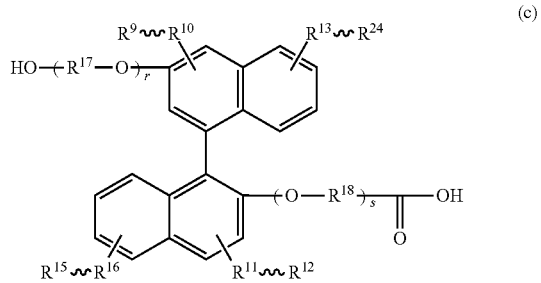

(c)

In formula (c), $R^7$-$R^{16}$, r and s are the same as defined in formula (1).

Although the following indicates typical specific examples of dicarboxylic acids represented by formula (c) or ester-forming derivatives thereof, the raw material used in formula (c) of the present invention is not limited thereto.

More specifically, preferable examples include 2,2'-biphenyl dicarboxylic acid, 2,2'-bis(carboxymethoxy)-1,1'-binaphthyl, 2,2'-bis(2-carboxyethoxy)-1,1'-binaphthyl, 2,2'-bis(3-carboxypropoxy)-1,1'-binaphthyl, 2,2'-bis(3-carboxy-2-methylpropoxy)-1,1'-binaphthyl and 2,2'-bis(4-carboxyphenylmethoxy)-1,1'-binaphthyl, and 2,2'-bis(carboxymethoxy)-1,1'-binaphthyl is more preferable.

These may be used alone or two or more types may be used in combination. In addition, acid chlorides, methyl esters, ethyl esters, phenyl esters and other esters may be used as ester-forming derivatives.

(Dicarboxylic Acid Components Other than Formula (1) and Formula (2))

Other dicarboxylic acid components may be copolymerized to a degree that does not impair the characteristics of the present invention for use as dicarboxylic acid components in the polyester resin or polyester carbonate resin of the present invention. These other dicarboxylic acid components are preferably present at less than 30 mol % in all repeating units.

Carboxylic acid components known in the art can be used as other dicarboxylic acid components used in the polyester resin or polyester carbonate resin of the present invention, and for example, carboxylic acid components as described in paragraph [0043] of PTL7 can be used.

A production method known in the art can be used for the production method of the polyester resin of the present invention, and for example, the production method described in paragraphs [0051] to [0060] of PTL7 can be used.

<Polyester Carbonate Resin Production Method>

The polyester carbonate resin of the present invention can be obtained by reacting a diol component and dicarboxylic acid component or ester-forming derivative thereof with a carboxylic acid-forming derivative such as phosgene or carbonate diester by interfacial polymerization or melt polymerization, and a catalyst, terminal stopping agent or antioxidant and the like may also be used.

In the case of using interfacial polymerization, a solution obtained by dissolving dicarboxylic acid chloride in an organic solvent incompatible with water (organic phase) with an aqueous alkaline solution containing an aromatic diol and polymerization catalyst (aqueous phase) followed by reacting with phosgene. The reaction temperature is 0° C. to 40° C. and preferably 25° C. or lower, and the polymerization reaction is preferably carried out for 0.5-8 hours while stirring.

A solvent that is incompatible with water and dissolves the polyester resin of the present invention is preferable for the solvent used for the organic phase. Preferable examples of such solvents include methylene chloride, 1,2-dichloroethane, chloroform, chlorobenzene and other chlorine-based solvents and toluene, benzene, xylene and other aromatic hydrocarbon-based solvents, and methylene chloride is more preferable in terms of being easy to use during production.

Preferable examples of aqueous alkaline solutions used in the aqueous phase included aqueous solutions of sodium hydroxide, potassium hydroxide or sodium carbonate.

Catalysts in the manner of tertiary amines, quaternary ammonium compounds or quaternary phosphonium compounds such as trimethylamine, tetra-n-butyl ammonium bromide or tetra-n-butyl phosphonium bromide can be used to accelerate the reaction.

The reaction using melt polymerization is normally a transesterification reaction between the diol component, dicarboxylic acid or ester-forming derivative thereof and a carbonate-forming derivative, and is carried out by mixing the diol component and dicarboxylic acid or ester-forming derivative thereof with the carbonate-forming derivative while heating in the presence of an inert gas followed by distilling off the water formed during the reaction along with hydroxyl compounds such as alcohols or phenol.

The reaction preferably proceeds as indicated below in the case of polymerization using a dicarboxylic acid component and carbonate-forming derivative as raw material monomers in particular. In the first stage of the reaction, an ester condensation reaction between the diol component and dicarboxylic acid component is allowed to proceed. In this reaction, water is produced as a by-product and the reaction is able to proceed even in the absence of a catalyst. After having removed water outside the system, in the second stage of condensation polymerization, a transesterification reaction is allowed to proceed with the carbonate-forming derivative, a polyester carbonate is preferably formed while hydroxyl compounds such as alcohols and phenol are produced as by-products, and this reaction preferably proceeds in the presence of a catalyst to be subsequently described.

Although varying according to the diol component used, the reaction temperature is preferably 120° C. to 350° C., more preferably 150° C. to 300° C. and even more preferably 180° C. to 270° C. The degree of vacuum is changed in steps and is ultimately made to be 0.13 kPa or less to distill off water formed and hydroxyl compounds such as alcohols and phenol outside the system. The reaction time is normally preferably about 1 hour to 10 hours.

Preferable examples of the carbonate-forming derivative include esters of optionally substituted aryl groups or aralkyl groups having 6 to 10 carbon atoms and alkyl groups having 1 to 4 carbon atoms. More specifically, preferable examples include diphenyl carbonate, ditolyl carbonate, bis(chlorophenyl) carbonate, m-cresyl carbonate, dinaphthyl carbonate, bis(biphenyl) carbonate, dimethyl carbonate, diethyl carbonate and dibutyl carbonate, and among these, diphenyl carbonate is more preferable.

In addition, a catalyst can be used to increase the degree of polymerization in the case of melt polymerization. Examples of catalysts that can be used preferably include catalysts normally used in esterification reactions and transesterification reactions such as alkaline metal compounds such as lithium acetate, sodium hydroxide, potassium hydroxide and sodium and potassium salts of divalent phenols, alkaline earth metal compounds such as calcium hydroxide, barium hydroxide or magnesium hydroxide, nitrogen-containing basic compounds such as tetramethyl ammonium hydroxide, tetraethyl ammonium hydroxide, trimethylamine or triethylamine, alkoxides of alkaline metals and alkaline earth metals, organic acid salts of alkaline metals and alkaline earth metals, zinc compounds, boron compounds, aluminum compounds, silicon compounds, germanium compounds, organic tin compounds, lead compounds, osmium compounds, antimony compounds, manganese compounds, magnesium compounds, titanium compounds, cobalt compounds and zirconium compounds. Among these, aluminum, tin, titanium and germanium compounds are more preferable from the viewpoints of resin melt stability and hue, while aluminum compounds are even more preferable.

The catalyst may be used alone or two or more types may be used in combination, and another compound may be used in combination as a co-catalyst. The amount of these polymerization catalysts used is preferably within the range of $1 \times 10^{-8}$ to $1 \times 10^{-3}$ moles based on a total of 1 mole for the total amount of all monomer units.

The aluminum or compound thereof preferably used as a catalyst has activity as a catalyst for polymerizing the polyester carbonate resin by an esterification reaction. The aluminum or aluminum compound acts as a catalyst of a carbonate formation reaction during polymerization that uses the diol component, dicarboxylic acid component and carbonate-forming derivative as monomer raw materials in particular.

Preferable examples of this aluminum or aluminum compound include aluminum metal, aluminum salts, aluminum chelate compounds, organic aluminum compounds and inorganic aluminum compounds.

Preferable examples of aluminum salts include organic acid salts and inorganic acid salts of aluminum. Examples of organic acid salts of aluminum include aluminum carboxylic acid salts, and specific preferable examples thereof include aluminum formate, aluminum acetate, aluminum propionate, aluminum oxalate, aluminum acrylate, aluminum laurate, aluminum stearate, aluminum benzoate, aluminum trichloroacetate, aluminum lactate, aluminum citrate and aluminum salicylate. Preferable examples of inorganic acid salts of aluminum include aluminum chloride, aluminum hydroxide, aluminum carbonate, aluminum phosphate and aluminum phosphonate.

Preferable examples of aluminum chelate compounds include aluminum acetyl acetonate, aluminum acetyl acetate, aluminum ethyl acetoacetate and aluminum ethyl acetoacetate di-isopropoxide.

Preferable examples of organic aluminum compounds include aluminum alkoxides such as trialkylaluminum, dialkylaluminum alkoxides, alkylaluminum dialkoxides, aluminum trialkoxides and hydrolysates thereof, and more specifically, preferable examples include aluminum methoxide, aluminum ethoxide, aluminum n-propoxide, aluminum isopropoxide, aluminum n-butoxide, aluminum tert-butoxide and other aluminum alkoxides, trimethyl aluminum, triethyl aluminum and hydrolysates thereof. Preferable examples of inorganic aluminum compounds include aluminum oxide.

In particular, carboxylic acid salts, inorganic acid salts and chelate compounds of aluminum are preferable, and among these, aluminum acetate, aluminum chloride, aluminum hydroxide, aluminum hydroxychloride and aluminum acetyl acetonate are more preferable.

Other compounds may be used in combination with these aluminum compounds as co-catalysts, and phosphorous compounds in particular improve the catalytic activity of aluminum or compounds thereof in a polymerization reaction of the polyester carbonate resin.

Examples of such phosphate compounds include phosphonic acid-based compounds, phosphinic acid-based compounds, phosphine oxide-based compounds, phosphonous acid-based compounds, phosphinous acid-based compounds and phosphine-based compounds. Among these, preferable examples include phosphonic acid-based compounds, phosphinic acid-based compounds and phosphine oxide-based compounds, while more preferable examples include phosphonic acid-based compounds.

Preferable examples of phosphonic acid-based compounds include dimethyl methylphosphonate, diethyl methylphosphonate, dihexyl methylphosphonate, dioctyl methylphosphonate, diphenyl methylphosphonate, dimethyl phenylphosphonate, diethyl phenylphosphonate, dihexyl phenylphosphonate, dioctyl phenylphosphonate, diphenyl phenylphosphonate, dimethyl benzylphosphonate, diethyl benzylphosphonate, dihexyl benzylphosphonate, dioctyl benzylphosphonate, diphenyl benzylphosphonate, dimethyl p-methylbenzylphosphonate, diethyl p-methylbenzylphosphonate, dihexyl p-methylbenzylphosphonate, dioctyl p-methylbenzylphosphonate, diphenyl p-methylbenzylphosphonate, dimethyl 3,5-di-tert-butyl-4-hydroxybenzylphosphonate, diethyl 3,5-di-tert-butyl-4-hydroxybenzylphosphonate, dihexyl 3,5-di-tert-butyl-4-hydroxybenzylphosphonate, dioctyl 3,5-di-tert-butyl-4-hydroxybenzylphosphonate and diphenyl 3,5-di-tert-butyl-4-hydroxybenzylphosphonate, while more preferable examples include dimethyl 3,5-di-tert-butyl-4-hydroxybenzylphosphonate, diethyl 3,5-di-tert-butyl-4-hydroxybenzylphosphonate, dihexyl 3,5-di-tert-butyl-4-hydroxybenzylphosphonate, dioctyl 3,5-di-tert-butyl-4-hydroxybenzylphosphonate and diphenyl 3,5-di-tert-butyl-4-hydroxybenzylphosphonate.

The molar ratio of the amount of phosphorous compound used to the amount of aluminum or compound thereof used is preferably within the range of 0.5 to 10, more preferably within the range of 1 to 5, and even more preferably within the range of 1.5 to 3.

There are no particular limitations on the form when adding catalyst, and the catalyst in the form of a powder and the like may be added to the monomer or the catalyst in the form of dispersion or solution in a solvent may be added to the monomer. In addition, a mixture obtained by mixing the aluminum or compound thereof with the phosphorous compound in advance may also be added, or the aluminum or compound thereof and the phosphorous compound may be added separately.

The polyester carbonate resin of the present invention may use a monofunctional hydroxyl compound normally used as a terminal stopping agent in the polymerization reaction thereof. In the case of using phosgene as a carbonate precursor in particular, monofunctional phenols are typically used as terminal stopping agents in order to adjust molecular weight, and since the terminals of the obtained resin are blocked by groups based on monofunctional phenols, thermal stability is superior in comparison with those which are not blocked. Preferable examples of other terminal stopping agents include epoxy compounds, oxazoline compounds, isocyanate compounds, carbodiimide compounds and ketene imine compounds.

The polyester carbonate resin of the present invention may contain a copolymerized component of a diol component other than the diol component, dicarboxylic acid or ester-forming derivative thereof.

<Impurities>
(Residual Phenol)

The content of residual phenol of the polyester carbonate resin of the present invention is preferably 1-500 ppm, more preferably 1-400 ppm and even more preferably 1-300 ppm.

The phenol content is preferably adjusted according to the reaction time at a pressure of 1.3 kPa or less. In the case of not carrying out the reaction at a degree of vacuum of 1.3 kPa or less, phenol content increases. In addition, if the reaction time is excessively long, an excess amount ends up distilling off from within the resin.

In addition, phenol content may also be adjusted after having obtained the polyester carbonate resin of the present invention. For example, a method consisting of dissolving the polyester carbonate resin of the present invention in an organic solvent followed by washing the organic solvent layer with water, or a method consisting of removing by devolatilization at a pressure of 133-13.3 Pa and temperature of 200° C. to 320° C. using a commonly used kneading apparatus such as a single-screw or twin-screw extruder or various types of kneaders.

The content of residual phenol in the polyester carbonate resin of the present invention makes it possible to improve molding fluidity without impairing heat resistance. However, if the amount of residual phenol exceeds 500 ppm, thermal stability during heating and melting is lacking and mold contamination during resin injection molding becomes severe, thereby making this undesirable. Moreover, phenol has the property of becoming colored when oxidized, thereby exacerbating the hue of the polyester carbonate resin. In addition, if the amount of residual phenol is less than 1 ppm, molding fluidity becomes inferior, thereby making this undesirable.

(Residual Fluorenone)

The residual fluorenone content of the polyester resin or polyester carbonate resin of the present invention is preferably 1-500 ppm, more preferably 1-300 ppm, even more preferably 1-100 ppm and particularly preferably 1-50 ppm or 1-40 ppm.

If the residual fluorenone content in the polyester resin or polyester carbonate resin of the present invention is greater than 500 ppm, the resin becomes extremely colored, thereby making this undesirable.

<Additives>

Additives such as mold release agents, heat stabilizers, ultraviolet absorbers, bluing agents, antistatic agents, flame retardants, plasticizers or fillers can be suitably added and used in the polyester resin or polyester carbonate resin of the present invention. Additives known in the art can be added according to a known method such as by referring to the method described in paragraphs [0062] to [0081] of PTL7.

<Optical Lens>

The polyester resin or polyester carbonate resin of the present invention is preferable for an optical member and particularly an optical lens. A known usage method can be used for the method for using the resin of the present invention in an optical member and optical lens in particular, such as by referring to the method described in paragraphs [0082] to [0086] of PTL7.

EXAMPLES

Although the following further provides an explanation of the present invention by listing examples thereof, the present invention is not limited thereto.

(1) Copolymerization Ratio: Copolymerization ratio was determined by measuring the $^1$H-NMR spectrum of the obtained resin with the JNM-ECZ 400S/L1 manufactured by JEOL Ltd.

(2) Specific Viscosity: The obtained resin was adequately dried followed by dissolving 0.7 g of the resin in 100 ml of methylene chloride and measuring specific viscosity (tsp) of the solution at 20° C. Time for the known volume (between marked lines) of the solution flowing through an Ostwald viscometer was measured in a constant temperature bath at 20±0.01° C. followed by determination of specific viscosity ($\eta_{sp}$) of the solution at 20° C. using the equation indicated below.

$$\eta_{sp}=(t_1-t_0)/t_0$$

$t_1$: Flowing time of resin solution
$t_0$: Flowing time of methylene chloride (3) Amount of Terminal Carboxylic Acid 0.1 g of resin dissolved in 20 ml of benzyl alcohol at 200° C. in a nitrogen atmosphere were titrated with bases. Phenol red was used for the indicator, The number of carboxylic acid terminals per ton of resin weight was calculated.

(4) Glass Transition Temperature (Tg): The obtained resin was measured at a heating rate of 20° C./min with the DSC-60A manufactured by Shimadzu Corp.

(5) Refractive index (nD): 3 g of the obtained resin were dissolved in 50 ml of methylene chloride, cast onto a glass Petri dish and adequately dried at room temperature followed by drying for 8 hours at a temperature of 120° C. or lower to prepare a film having a thickness of about 100 μm. This film was measured for refractive index at 25° C. (wavelength: 589 nm) and Abbe number (calculated using the following equation from the refractive indices at 486 nm, 589 nm and 656 nm) using a DR-M2 Abbe refractometer manufactured by ATAGO Co., Ltd.

$$v=(nD-1)/(nF-nC)$$

Furthermore, in the present invention:
nD: refractive index at wavelength of 589 nm
nC: refractive index at wavelength of 656 nm
nF: refractive index at wavelength of 486 nm.

(6) Absolute Value of Orientation Birefringence (|Δn|)

The film having a thickness of 100 μm prepared in (5) above was stretched two times at a temperature 10° C. higher than Tg followed by measurement of retardation (Re) at 589 nm using the M-220 Ellipsometer manufactured by JASCO Corp and determining the absolute value of orientation birefringence using the equation indicated below.

$$|\Delta n|=|Re/d|$$

Δn: orientation birefringence
Re: retardation (nm)
d: thickness (nm)

(7) Hue: 1.0 g of the obtained resin was dissolved in 5 ml of methylene chloride followed by measuring the b* value (yellow index) of that solution with the U-3310 Spectrophotometer manufactured by HITACHI Ltd.

(8) Wet Heat Resistance: Pellets of the obtained resin were treated for 500 hours in an environment at a temperature of 85° C. and relative humidity of 85% followed by evaluation of wet heat resistance according to the equation indicated below.

Wet heat resistance (%)=[specific viscosity of resin after treatment]/[specific viscosity of resin before treatment]×100

(9) Formability: Resin pellets were vacuum-dried for 8 hours at 120° C. followed by injection molding into a lens measuring ϕ5 mm and having a thickness of 0.3 mm, convex radius of curvature of 5 mm and concave radius of curvature of 4 mm using the SE30DU Injection Molding Machine manufactured by Sumitomo Heavy Industries, Ltd. at a molding temperature 110° C. higher than Tg and mold temperature of 10° C. lower than Tg. Filling defects, molding defects and mold deposits and the like of the lens were evaluated visually during molding of 500 lenses and formability was evaluated as "A" for a defect probability of less than 5%, "B" for a defect probability of 5% to less than 20%, or "C" for a defect probability of 20% or more.

(10) Residual Fluorenone and Phenol Contents

The residual amounts of fluorenone and phenol in the resin were analyzed by HPLC with a gradient program at a column temperature of 30° C. and detector wavelengths of 253 nm and 277 nm using an acetonitrile eluent and a mixture of 0.2% aqueous acetic acid and acetonitrile with the Develosil ODS-7 column manufactured by Nomura Chemical Co., Ltd. A calibration curve was prepared and quantified using fluorenone and phenol standards. Measurement was carried out by dissolving 1.5 g of resin in 15 ml of methylene chloride followed by adding 135 ml of acetonitrile and stirring, concentrating with an evaporator, passing through a 0.2 μm filter and injection of 10 μl of this acetonitrile solution.

Example 11

46.8 parts by weight of 2,2'-bis(carboxymethoxy)-1,1'-binaphthyl (abbreviated as BCMB), 31.4 parts by weight of 9,9-bis[6-(2-hydroxyethoxy)-2-naphthyl]fluorene (abbreviated as BNEF), 21.8 parts by weight of 2,2'-bis(2-hydroxyethoxy)-1,1'-binaphthyl (abbreviated as BHEB) and 4.0×$10^{-3}$ parts by weight of tetrabutoxytitanium (IV) were placed in a reaction tank equipped with a stirrer and distiller and nitrogen substitution was carried out three times followed by heating the jacket to 200° C. to melt the raw materials. After melting completely, the pressure was reduced to 40 kPa over the course of 20 minutes. Subsequently, the jacket was heated to 260° C. at the rate of 60° C./hr to carry out an esterification reaction. Subsequently, pressure was reduced to 0.13 kPa over the course of 50 minutes while holding the jacket at 260° C. and a polymerization reaction was carried out until a prescribed stirring torque was reached under conditions of 260° C. and 0.13 kPa. Following completion of the reaction, the formed resin was taken out while pelletizing to obtain pellets of polyester resin. The obtained polyester resin was analyzed by $^1$H-NMR and the BCMB component was confirmed to have been comprised at 50 mol %, the BNEF component at 25 mol % and the BHEB component at 25 mol % based on all monomer units. The specific viscosity of the obtained polyester resin was 0.26, the amount of terminal carboxylic acid was 10 equivalents/ton, Tg was 149° C., refractive index was 1.684, Abbe number was 17.9, the absolute value of orientation birefringence was 2.1×$10^{-3}$, b* was 4.2, wet heat resistance was 78% and formability was A. Residual fluorenone content was 50 ppm.

Example 2

Pellets of polyester resin were obtained by carrying out the same method as Example 1 by placing 50.5 parts by weight of BCMB, 33.8 parts by weight of BNEF, 14.1 parts by weight of BHEB, 16.0 parts by weight of ethylene glycol (abbreviated as EG) and 4.3×$10^{-3}$ parts by weight of tetrabutoxytitanium (IV) in a reaction tank equipped with a stirrer and distiller. The obtained polyester resin was confirmed to have the BCMB component at 50 mol %, the BNEF component at 25 mol %, the BHEB component at 15 mol % and the EG component at 10 mol %. The specific viscosity of the obtained polyester resin was 0.26, the amount of terminal carboxylic acid was 10 equivalents/ton, Tg was 147° C., refractive index was 1.683, Abbe number was 17.9, the absolute value of orientation birefringence was 2.0×$10^{-3}$, b* was 4.4, wet heat resistance was 78% and formability was A.

Example 3

Polyester resin pellets were obtained using the same method as Example 1 with the exception of using 45.1 parts by weight of BCMB of Example 1, 42.3 parts by weight of BNEF, 12.6 parts by weight of BHEB and 3.8×$10^{-3}$ parts by weight of tetrabutoxytitanium (IV). The obtained polyester resin was confirmed to have been comprised of the BCMB component at 50 mol %, the BNEF component at 35 mol % and the BHEB component at 15 mol %. The specific viscosity of the obtained polyester resin was 0.26, the amount of terminal carboxylic acid was 12 equivalents/ton, Tg was 154° C., refractive index was 1.684, Abbe number was 18.0, the absolute value of orientation birefringence was 3.2×$10^{-3}$, b* was 4.5, wet heat resistance was 76% and formability was A.

Example 4

39.0 parts by weight of BCMB, 36.0 parts by weight of BNEF, 25.0 parts by weight of BHEB and 8.7 parts by weight of diphenyl carbonate (abbreviated as DPC) were placed in a reaction tank equipped with a stirrer and distiller and nitrogen substitution was carried out three times followed by heating the jacket to 200° C. and melting the raw materials. After melting completely, the pressure was reduced to 40 kPa over the course of 20 minutes. After heating the jacket to 260° C. at the rate of 60° C./hr, pressure was reduced to 26 kPa over the course of 20 minutes while holding the jacket at 260° C. Subsequently, 22.4×$10^{-3}$ parts by weight of aluminum acetyl acetonate (abbreviated as Al(acac)$_3$) and 49.3×$10^{-3}$ parts by weight of diethyl 3,5-di-tert-butyl-4-hydroxybenzyl phosphonate (abbreviated as DEBHBP) were added to the reaction tank. Subsequently, the pressure was reduced to 0.13 kPa over the course of 70 minutes while holding the jacket at 260° C. and a polymerization reaction was carried out until a prescribed stirring torque was reached under conditions of 260° C. and 0.13 kPa or lower. Following completion of the reaction, the formed pellets were taken out while pelletizing to obtain pellets of polyester carbonate resin. The obtained polyester carbonate resin was confirmed to have been comprised of the BCMB component at 42 mol %, the BNEF component at 29 mol % and the BHEB component at 29 mol %. The specific viscosity of the obtained polyester resin was 0.27, the amount of terminal carboxylic acid was 1 equivalent/ton, Tg was 148° C., refractive index was 1.683, Abbe number was 17.9, the absolute value of orientation birefringence was $2.4 \times 10^{-3}$, b* was 1,7, wet heat resistance was 99% and formability was A. The residual fluorenone content was 40 ppm and the residual phenol content was 250 ppm.

Example 5

Polyester carbonate resin pellets were obtained using the same method as Example 4 with the exception of using 44.0 parts by weight of BCMB of Example 4, 19.6 parts by weight of BNEF, 36.4 parts by weight of BHEB, 5.7 parts by weight of DPC, $23.6 \times 10^{-3}$ parts by weight of Al(acac)$_3$ and $52.0 \times 10^{-3}$ parts by weight of DEBHBP. The obtained polyester carbonate resin was confirmed to have been comprised of the BCMB component at 45 mol %, the BNEF component at 15 mol % and the BHEB component at 40 mol %. The specific viscosity of the obtained polyester carbonate resin was 0.27, the amount of terminal carboxylic acid was 1 equivalent/ton, Tg was 142° C., refractive index was 1.685, Abbe number was 18, the absolute value of orientation birefringence was $1.6 \times 10^{-3}$, b* was 1.5, wet heat resistance was 98% and formability was A. The residual fluorenone content was 40 ppm and the residual phenol content was 220 ppm.

Example 6

Polyester carbonate resin pellets were obtained using the same method as Example 4 with the exception of using 42.3 parts by weight of BCMB of Example 4, 31.5 parts by weight of BNEF, 26.2 parts by weight of BHEB, 5.5 parts by weight of DPC, $22.7 \times 10^{-3}$ parts by weight of Al(acac)$_3$ and $50.0 \times 10^{-3}$ parts by weight of DEBHBP. The obtained polyester carbonate resin was confirmed to have been comprised of the BCMB component at 45 mol %, the BNEF component at 25 mol % and the BHEB component at 30 mol %. The specific viscosity of the obtained polyester carbonate resin was 0.27, the amount of terminal carboxylic acid was 2 equivalents/ton, Tg was 148° C., refractive index was 1.686, Abbe number was 18, the absolute value of orientation birefringence was $2.0 \times 10^{-3}$, b* was 1.6, wet heat resistance was 99% and formability was A. The residual fluorenone content was 50 ppm and the residual phenol content was 250 ppm.

Example 7

Polyester carbonate resin pellets were obtained using the same method as Example 4 with the exception of using 40.0 parts by weight of BCMB of Example 1, 47.6 parts by weight of BNEF, 12.4 parts by weight of BHEB, 5.2 parts by weight of DPC, $21.5 \times 10^{-3}$ parts by weight of Al(acac)$_3$ and $47.2 \times 10^{-3}$ parts by weight of DEBHBP. The obtained polyester carbonate resin was confirmed to have been comprised of the BCMB component at 45 mol %, the BNEF component at 40 mol % and the BHEB component at 15 mol %. The specific viscosity of the obtained polyester carbonate resin was 0.27, the amount of terminal carboxylic acid was 2 equivalents/ton, Tg was 152° C., refractive index was 1.690. Abbe number was 17.8, the absolute value of orientation birefringence was $3.3 \times 10^{-3}$, b* was 1.8, wet heat resistance was 99% and formability was A.

Comparative Example 1

Polyester resin pellets were obtained using the same method as Example 1 with the exception of using 51.8 parts by weight of BCMB of Example 1, 48.2 parts by weight of BHEB, 0 parts by weight of BNEF and $4.4 \times 10^{-3}$ parts by weight of tetrabutoxytitanium (IV). The specific viscosity of the obtained polyester resin was 0.24, the amount of terminal carboxylic acid was 13 equivalents/ton, Tg was 133° C., refractive index was 1.679, Abbe number was 18.3, the absolute value of orientation birefringence was $0.2 \times 10^{-3}$, b* was 4.4 and wet heat resistance was 75%.

Comparative Example 2

Polyester resin pellets were obtained using the same method as Comparative Example 1 with the exception of using 47.9 parts by weight of BCMB of Comparative Example 1, 52.1 parts by weight of 9,9-bis[4-(2-hydroxyethoxy)phenyl] fluorene (abbreviated as BPEF) instead of BHEB and $4.0 \times 10^{-3}$ parts by weight of tetrabutoxytitanium (IV). The specific viscosity of the obtained polyester resin was 0.27, the amount of terminal carboxylic acid was 12 equivalents/ton, Tg was 148° C., refractive index was 1.662, Abbe number was 20.8, the absolute value of orientation birefringence was $0.3 \times 10^{-3}$, be was 4.5 and wet heat resistance was 76%. The residual fluorenone content was 5 ppm.

Comparative Example 3

Polyester carbonate resin pellets were obtained using the same method as Example 4 with the exception of using 44.9 parts by weight of BCMB of Example 4, 27.9 parts by weight of BHEB, 27.2 parts by weight of BPEF instead of BNEF, 5.8 parts by weight of DPC, $24.1 \times 10^{-3}$ parts by weight of Al(acac)$_3$ and $53.1 \times 10^{-3}$ parts by weight of DEBHBP. The specific viscosity of the obtained polyester carbonate resin was 0.27, the amount of terminal carboxylic acid was 2 equivalents/ton, Tg was 139° C., refractive index was 1.671, Abbe number was 19.5, the absolute value of orientation birefringence was $0.1 \times 10^{-3}$, b* was 1.6 and wet heat resistance was 98%. The residual fluorenone content was 240 ppm.

Comparative Example 4

Polyester carbonate resin pellets were obtained using the same method as Comparative Example 3 with the exception of using 44.1 parts by weight of BCMB of Comparative Example 3, 25.5 parts by weight of BHEB, 33.5 parts by weight of 9,9-bis[4-(2-hydroxyethoxy)-3-phenylphenyl] fluorene instead of BPEF, 5.3 parts by weight of DPC, $22.1 \times 10^{-3}$ parts by weight of Al(acac)$_3$ and $48.5 \times 10^{-3}$ parts by weight of DEBHBP. The specific viscosity of the obtained polyester carbonate resin was 0.27, the amount of terminal carboxylic acid was 2 equivalents/ton, Tg was 141° C., refractive index was 1.674, Abbe number was 18.8, the absolute value of orientation birefringence was $0.7 \times 10^{-3}$, b* was 1.7 and wet heat resistance was 99%.

Comparative Example 5

85.2 parts by weight of BNEF, 14.8 parts by weight of BHEB, 46.6 parts by weight of DPC and $3.2 \times 10^{-3}$ parts by weight of tetrabutoxytitanium (IV) were placed in a reaction tank equipped with a stirrer and distiller and nitrogen substitution was carried out three times followed by heating the jacket to 200° C. and melting the raw materials. After melting completely, the pressure was reduced to 40 kPa over the course of 20 minutes. After heating the jacket to 260° C. at the rate of 60° C./hr, pressure was reduced to 26 kPa over the course of 20 minutes while holding the jacket at 260° C. Subsequently, the pressure was reduced to 0.13 kPa over the course of 70 minutes and a polymerization reaction was carried out until a prescribed stirring torque was reached under conditions of 260° C. and 0.13 kPa or lower. Following completion of the reaction, the formed resin was taken out while pelletizing to obtain pellets of polycarbonate resin. The obtained polycarbonate resin was confirmed to have been comprised of the BNEF component at 80 mol % and the BHEB component at 20 mol %. The specific viscosity of the obtained polycarbonate resin was 0.26, Tg was 170° C., refractive index was 1.681, Abbe number was 18.4, the absolute value of orientation birefringence was $6.1 \times 10^{-3}$, b* was 1.8, wet heat resistance was 99% and formability was C.

TABLE 1

| | Component Ratio (mol %) | | | | | | Repeating Units (mol %) | | |
|---|---|---|---|---|---|---|---|---|---|
| | Diol Component | | | | | Dicarboxylic Acid Component | Formula (1) | Formula (2) | Formula (1):Formula (2) |
| | BNEF | BHEB | BPEF | BOPPEF | EG | BCMB | | | |
| Example 1 | 25 | 25 | — | — | — | 50 | 50 | 50 | 50:50 |
| Example 2 | 25 | 15 | — | — | 10 | 50 | 50 | 30 | 63:37 |
| Example 3 | 35 | 15 | — | — | — | 50 | 70 | 30 | 70:30 |
| Example 4 | 29 | 29 | — | — | — | 42 | 36 | 36 | 50:50 |
| Example 5 | 15 | 40 | — | — | — | 45 | 22 | 60 | 27:73 |
| Example 6 | 25 | 30 | — | — | — | 45 | 37 | 45 | 45:55 |
| Example 7 | 40 | 15 | — | — | — | 45 | 60 | 22 | 73:27 |
| Comp. Ex. 1 | — | 50 | — | — | — | 50 | — | 100 | — |
| Comp. Ex. 2 | — | — | 50 | — | — | 50 | — | 0 | — |
| Comp. Ex. 3 | — | 30 | 25 | — | — | 45 | — | 25 | — |
| Comp. Ex. 4 | — | 30 | — | 25 | — | 45 | — | 25 | — |
| Comp. Ex. 5 | 80 | 20 | — | — | — | 0 | — | — | — |

| | Evaluation Results | | | | | | | |
|---|---|---|---|---|---|---|---|---|
| | Specific Viscosity | Terminal Carboxylic Acid (Eq/ton) | Tg (° C.) | Refractive Index (nd) | Abbe Number (v) | $|\Delta n|$ ($\times 10^{-3}$) | Hue b* | Wet Heat Resistance (%) |
| Example 1 | 0.26 | 10 | 149 | 1.684 | 17.9 | 2.1 | 4.2 | 78 |
| Example 2 | 0.26 | 10 | 147 | 1.683 | 17.9 | 2.0 | 4.4 | 78 |
| Example 3 | 0.26 | 12 | 154 | 1.684 | 18.0 | 3.2 | 4.5 | 76 |
| Example 4 | 0.27 | 1 | 148 | 1.683 | 17.9 | 2.4 | 1.7 | 99 |
| Example 5 | 0.27 | 1 | 142 | 1.685 | 18.0 | 1.6 | 1.5 | 98 |
| Example 6 | 0.27 | 2 | 148 | 1.686 | 18.0 | 2.0 | 1.6 | 99 |
| Example 7 | 0.27 | 2 | 152 | 1.690 | 17.8 | 3.3 | 1.8 | 99 |
| Comp. Ex. 1 | 0.24 | 13 | 133 | 1.679 | 18.3 | 0.2 | 4.4 | 75 |
| Comp. Ex. 2 | 0.27 | 12 | 148 | 1.662 | 20.8 | 0.3 | 4.5 | 76 |
| Comp. Ex. 3 | 0.27 | 2 | 139 | 1.671 | 19.5 | 0.1 | 1.6 | 98 |
| Comp. Ex. 4 | 0.27 | 2 | 141 | 1.674 | 18.8 | 0.7 | 1.7 | 99 |

TABLE 1-continued

| | | | | | | | | |
|---|---|---|---|---|---|---|---|---|
| Comp. Ex. 5 | 0.26 | — | 170 | 1.681 | 18.4 | 6.1 | 1.8 | 99 |

BNEF: 9,9-bis[6-(2-hydroxyethoxy)-2-naphthyl] fluorene
BHEB: 2,2-bis(2-hydroxyethoxy)-1,1'-binaphthyl
BPEF: 9,9-bis[4-(2-hydroxyethoxy)phenyl] fluorene
BOPPEF: 9,9-bis[4-(2-hydroxyethoxy)-3-phenylphenyl] fluorene
EG: Ethylene glycol
BCMB: 2,2'-bis(carboxymethoxy)-1,1'-binaphthyl The polyester resins or polyester carbonate resins obtained in Examples 1-7 demonstrated high refractive indices, low Abbe numbers, a superior balance between heat resistance and formability, and low birefringence for use as optical lenses. In contrast, the polyester resins or polyester carbonate resins of Comparative Examples 1-4 demonstrated low refractive indices and high Abbe numbers. Although the refractive index and heat resistance of the polycarbonate resin of Comparative Example 5 were high, formability was inferior.

INDUSTRIAL APPLICABILITY

The polyester resin or polyester carbonate resin of the present invention is used in optical materials and can be used in optical members such as a lens, prism, optical disk, transparent conductive substrate, optical card, sheet, film, optic fiber, optical film, optical filter or hard coating film, and is extremely useful in a lens in particular.

The invention claimed is:

1. A polyester resin or polyester carbonate resin comprising repeating units represented by the following formulas (1) and (2), wherein the ratio of the repeating unit represented by the following formula (1) and repeating unit represented by the following formula (2) is 15:85 to 85:15:

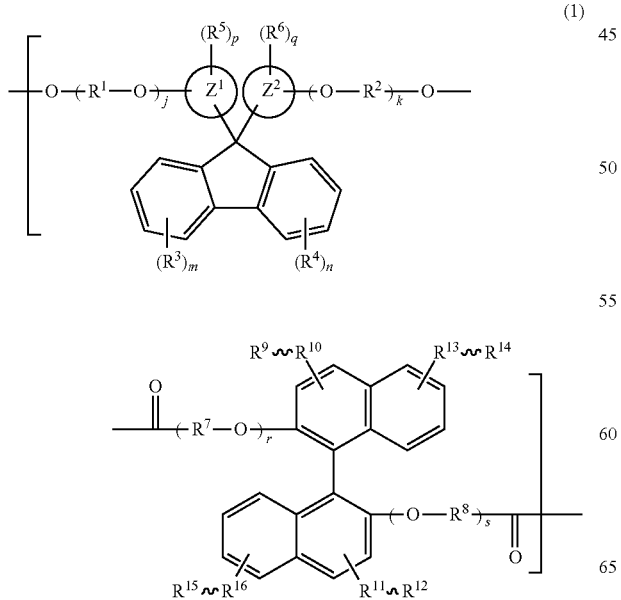

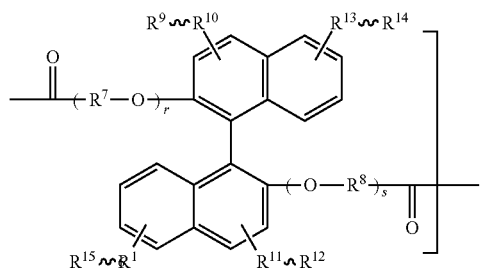

wherein, rings $Z^1$ and $Z^2$ respectively represent a polycyclic aromatic hydrocarbon group having 9 to 20 carbon atoms, $R^1$, $R^2$, $R^7$ and $R^8$ respectively and independently represent a hydrocarbon group that may contain an aromatic group having 1 to 12 carbon atoms, $R^3$-$R^6$ and $R^9$-$R^{16}$ represent hydrogen atoms or aliphatic or aromatic substituents, j, k, r and s respectively and independently represent an integer of 0 or more, and m, n, p and q respectively and independently represent 1 or 2; and

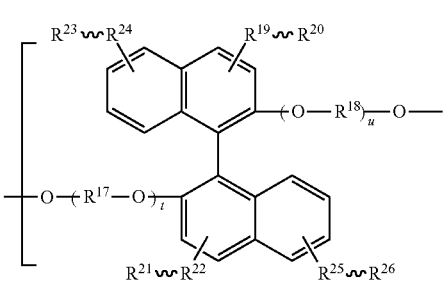

wherein, $R^7$, $R^8$, $R^{17}$ and $R^{18}$ respectively and independently represent a hydrocarbon group that may contain an aromatic group having 1 to 12 carbon atoms, $R^9$-$R^{16}$ and $R^{19}$-$R^{26}$ represent hydrogen atoms or aliphatic or aromatic substituents, and r, s, t and u respectively and independently represent an integer of 0 or more.

2. The polyester resin or polyester carbonate resin according to claim 1, wherein $Z^1$ and $Z^2$ in formula (1) represent naphthalene-diyl groups.

3. The polyester resin or polyester carbonate resin according to claim 1, wherein formula (1) is composed of the unit represented by the following formula (3):

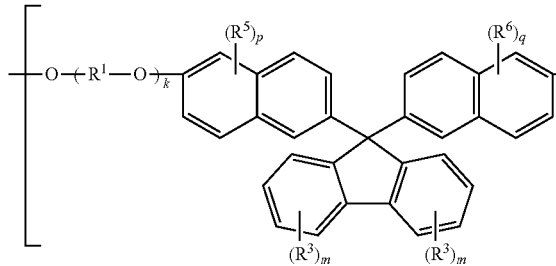 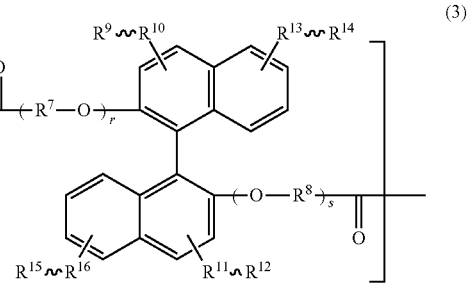

(3)

wherein, $R^1$, $R^2$, $R^7$ and $R^8$ respectively and independently represent a hydrocarbon group that may contain an aromatic group having 1 to 12 carbon atoms, $R^3$-$R^6$ and $R^9$-$R^{16}$ represent hydrogen atoms or aliphatic or aromatic substituents, j, k, r and s respectively and independently represent an integer of 0 or more, and m, n, p and q respectively and independently represent 1 or 2.

4. The polyester resin or polyester carbonate resin according to claim 3, wherein $R^3$-$R^6$ and $R^9$-$R^{16}$ in formula (3) represent hydrogen atoms, and j, k, r, s, m, n, p and q represent 1.

5. The polyester resin or polyester carbonate resin according to claim 3, wherein $R^1$ and $R^2$ in formula (3) represent ethylene groups and $R^7$ and $R^8$ represent methylene groups.

6. The polyester resin or polyester carbonate resin according to claim 1, wherein the repeating unit represented by formula (1) constitutes 20 mol % or more of all repeating units.

7. The polyester resin or polyester carbonate resin according to claim 1, wherein $R^9$-$R^{16}$ and $R^{19}$-$R^{26}$ represent hydrogen atoms and r, s, t and u represent 1.

8. The polyester resin or polyester carbonate resin according to claim 1, wherein $R^7$ and $R^8$ in formula (2) represent methylene groups and $R^{17}$ and $R^{18}$ represent ethylene groups.

9. The polyester resin or polyester carbonate resin according to claim 1, wherein the repeating unit represented by formula (2) constitutes 20 mol % or more of all repeating units.

10. The polyester resin or polyester carbonate resin according to claim 1, wherein the ratio of the repeating unit represented by formula (1) and the repeating unit represented by formula (2) is 25:75 to 75:25.

11. The polyester resin or polyester carbonate resin according to claim 1, wherein refractive index is 1.680 to 1.695.

12. The polyester resin or polyester carbonate resin according to claim 1, wherein the glass transition temperature is 140° C. to 155° C.

13. The polyester resin or polyester carbonate resin according to claim 1, wherein the amount of fluorenone contained therein is 1 to 500 ppm or less.

14. An optical member composed of the polyester resin or polyester carbonate resin according to claim 1.

15. The optical member according to claim 14, which is an optical lens.

* * * * *